(12) United States Patent
Tolt

(10) Patent No.: US 7,521,851 B2
(45) Date of Patent: Apr. 21, 2009

(54) ELECTRON EMITTING COMPOSITE BASED ON REGULATED NANO-STRUCTURES AND A COLD ELECTRON SOURCE USING THE COMPOSITE

(76) Inventor: Zhidan L Tolt, 4018 Ellmar Oaks Dr., San Jose, CA (US) 95136

(*) Notice: Subject to any disclaimer, the term of this patent is extended or adjusted under 35 U.S.C. 154(b) by 0 days.

(21) Appl. No.: 11/467,876

(22) Filed: Aug. 28, 2006

(65) Prior Publication Data

US 2006/0284537 A1  Dec. 21, 2006

Related U.S. Application Data

(63) Continuation of application No. 10/807,890, filed on Mar. 24, 2004, now abandoned.

(60) Provisional application No. 60/521,135, filed on Feb. 24, 2004, provisional application No. 60/491,570, filed on Jul. 30, 2003, provisional application No. 60/457,210, filed on Mar. 24, 2003.

(51) Int. Cl.
*H01J 19/06* (2006.01)
*H01J 1/14* (2006.01)
*H01K 1/04* (2006.01)

(52) U.S. Cl. ............ 313/311; 313/496; 313/296; 313/306; 313/310; 313/346 R

(58) Field of Classification Search ........... 313/306, 313/309–310, 495–497, 315, 355, 293–304, 313/346, 351
See application file for complete search history.

(56) References Cited

U.S. PATENT DOCUMENTS

| | | | |
|---|---|---|---|
| 5,564,959 A | 10/1996 | Spindt et al. | |
| 5,869,922 A | 2/1999 | Tolt | |
| 5,990,604 A | 11/1999 | Geis et al. | |
| 6,000,980 A | 12/1999 | Baldi et al. | |
| 6,097,138 A | 8/2000 | Nakamoto | |
| 6,250,984 B1* | 6/2001 | Jin et al. | 445/51 |
| 6,283,812 B1* | 9/2001 | Jin et al. | 445/24 |
| 6,333,598 B1 | 12/2001 | Hsu et al. | |

(Continued)

FOREIGN PATENT DOCUMENTS

KR         2002031819 A     5/2002

OTHER PUBLICATIONS

Office Action from U.S. Appl. No. 10/707,342, filed Jun. 8, 2007.

(Continued)

*Primary Examiner*—Mariceli Santiago
*Assistant Examiner*—Jose M Diaz

(57) ABSTRACT

A field emission electron source includes a substrate, a first conductive electrode terminated to provide electrons, an emitting composite layer for emitting electrons, and a second electrode insulated from the emitter layer and terminated to extract electrons through vacuum space. The emitting composite layer lies between and parallel to the said first and the second electrodes, and comprises nano-structures embedded in a solid matrix. One end of the nano-structures is truncated and exposed at the surface of the emitter layer so that both the length and the apex of the nano-structure are regulated and the exposed nano-tips are kept substantially the same distance from the gate electrode. The embedding material is chosen to form triple junctions with the exposed tip to further enhance the field.

36 Claims, 11 Drawing Sheets

U.S. PATENT DOCUMENTS

| | | | |
|---|---|---|---|
| 6,440,761 B1 | 8/2002 | Choi | |
| 6,440,763 B1 | 8/2002 | Hsu | |
| 6,448,701 B1 | 9/2002 | Hsu | |
| 6,504,292 B1* | 1/2003 | Choi et al. | 313/310 |
| 6,515,415 B1 | 2/2003 | Morita | |
| 6,525,461 B1 | 2/2003 | Iwasaki et al. | |
| 6,538,367 B1 | 3/2003 | Choi et al. | |
| 6,635,983 B1 | 10/2003 | Raina et al. | |
| 6,664,727 B2 | 12/2003 | Nakamoto | |
| 6,670,629 B1 | 12/2003 | Wilson | |
| 6,692,324 B2 | 2/2004 | Simpson et al. | |
| 6,713,947 B2* | 3/2004 | Hirasawa et al. | 313/313 |
| 6,741,019 B1 | 5/2004 | Filas et al. | |
| 6,770,353 B1 | 8/2004 | Mardilovich et al. | |
| 6,774,548 B2 | 8/2004 | Fran et al. | |
| 6,812,480 B2 | 11/2004 | Lee et al. | |
| 6,858,455 B2 | 2/2005 | Guillorn et al. | |
| 6,858,521 B2 | 2/2005 | Jin | |
| 6,864,162 B2 | 3/2005 | Jin | |
| 6,935,915 B2 | 8/2005 | Park et al. | |
| 7,095,040 B2* | 8/2006 | Iwasaki et al. | 257/10 |
| 7,105,596 B2* | 9/2006 | Smalley et al. | 524/495 |
| 7,205,069 B2 | 4/2007 | Smalley et al. | |
| 2002/0060514 A1* | 5/2002 | Nakamoto | 313/311 |
| 2002/0076846 A1 | 6/2002 | Ihm | |
| 2002/0094438 A1 | 7/2002 | Gates et al. | |
| 2002/0169235 A1 | 11/2002 | West et al. | |
| 2002/0172820 A1 | 11/2002 | Majumdar et al. | |
| 2002/0175323 A1 | 11/2002 | Guillorn et al. | |
| 2002/0175408 A1 | 11/2002 | Majumdar et al. | |
| 2003/0001490 A1* | 1/2003 | Yamamoto et al. | 313/495 |
| 2003/0030356 A1 | 2/2003 | Fran et al. | |
| 2003/0097976 A1* | 5/2003 | Zehnder et al. | 117/68 |
| 2003/0102797 A1* | 6/2003 | Kajiwara | 313/486 |
| 2003/0122467 A1* | 7/2003 | Cho et al. | 313/309 |
| 2003/0127960 A1* | 7/2003 | Jeong et al. | 313/309 |
| 2003/0143788 A1 | 7/2003 | Chen et al. | |
| 2004/0036401 A1 | 2/2004 | Konuma et al. | |
| 2004/0157449 A1 | 8/2004 | Hidaka et al. | |
| 2004/0173506 A1 | 9/2004 | Doktycz et al. | |
| 2005/0067935 A1 | 3/2005 | Lee et al. | |
| 2005/0079659 A1 | 4/2005 | Duan et al. | |
| 2006/0021564 A1 | 2/2006 | Norman et al. | |

OTHER PUBLICATIONS

Office Action from U.S. Appl. No. 11/467,880, filed May 17, 2007.
Bonard et al., Aug. 17, 1998, "Field Emission from Single-Wall Carbon Nanotube Films," Appl. Phys. Lett. 73(7):918-20.
Chhowalla et al., Nov. 15, 2001, "Growth Process Conditions of Vertically Aligned Carbon Nanotubes Using Plasma Enhanced Chemical Vapor Deposition," J. Appl. Phys. 90(10):5308-17.
Dean et al., Nov. 8, 1999, "The Environmental Stability of Field Emission from Single-Walled Carbon Nanotubes," Appl. Phys. Lett. 75(19):3017-19.
Fowler et al., Mar. 31, 1928, "Electron Emission in Intense Electric Fields," Proc. Royal Soc. London A119:173-81.
Geis et al., 1997, "Theory and Experimental Results of a New Diamond Surface-Emission Cathode," Lincoln Lab. J. 10(1):3-18.
Guillorn et al., Nov. 19, 2001, "Operation of a Gated Field Emitter Using an Individual Carbon Nanofiber Cathode," Appl. Phys. Lett. 79(21):3506-08.
Li et al., Jul. 19, 1999, "Highly-Ordered Carbon Nanotube Arrays for Electronics Applications," Appl. Phys. Lett. 75(3):367-69.
Mayer et al., 2002, "Theoretical Comparison Between Field Emission from Single-Wall and Multi-Wall Carbon Nanotubes," Phys. Rev. B 65:155420.1-155420.6.
Nilsson et al., Apr. 10, 2000, "Scanning Field Emission from Patterned Carbon Nanotube Films," Appl. Phys. Lett. 76(15):2071-73.
Read et al., 2001, "Carbon Nanotube-Based Cathodes for Microwave Tubes," Proc. of the 2001 Particle Accelerator Conference, IEEE Conf. Abstr.: 1026-28.
Ren et al., Nov. 6, 1998, "Synthesis of Large Arrays of Well-Aligned Carbon Nanotubes on Glass," Science 282:1105-07.
Rinzler et al., Sep. 15, 1995, "Unraveling Nanotubes: Field Emission from an Atomic Wire," Science 269: 1550-53.
Saito et al., Oct. 1, 1997, "Field Emission Patterns from Single-Walled Carbon Nanotubes," Jpn. J. App. Phys. Part 2, 36(10A):L1340-42.
Wang et al., Feb. 26, 2001 "Flat Panel Display Prototype Using Gated Carbon Nanotube Field Emitters," Appl. Phys. Lett. 78(9):1294-96.

* cited by examiner

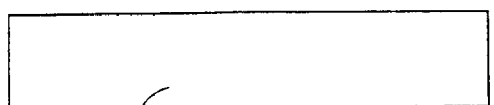
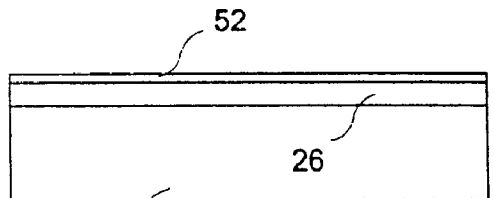
FIG. 2A  FIG. 2B
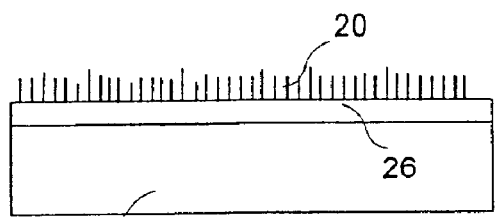
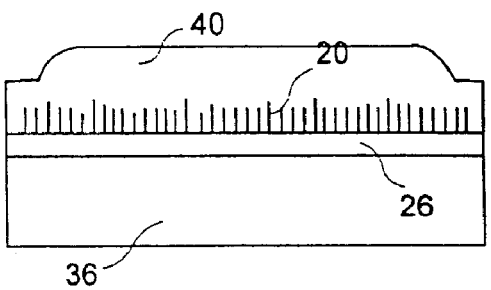
FIG. 2C  FIG. 2D
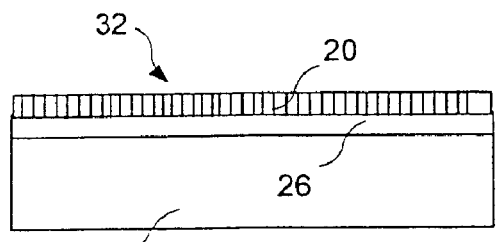
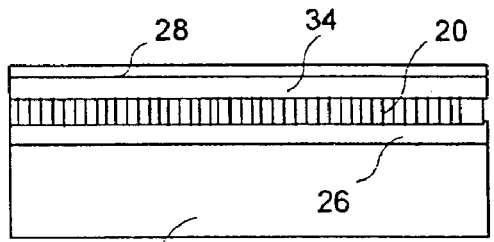
FIG. 2E  FIG. 2F
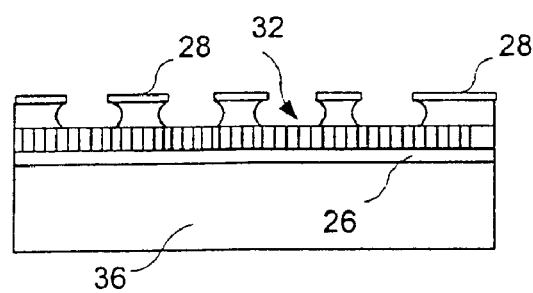
FIG. 2G

ELECTRON EMITTING COMPOSITE BASED ON REGULATED NANO-STRUCTURES AND A COLD ELECTRON SOURCE USING THE COMPOSITE

CROSS REFERENCE TO RELATED APPLICATIONS

This application claims priority to and incorporates by reference each of the following applications:

U.S. Provisional Application titled ELECTRON SOURCE BASED ON REGULATED NANO-STRUCTURED MATERIALS, Ser. No. 60/457,210, filed Mar. 24, 2003;

U.S. Provisional Application titled COLD ELECTRON SOURCE BASED ON REGULATED NANO-STRUCTURED MATERIALS, Ser. No. 60/491,570, filed Jul. 30, 2003; and U.S. Provisional Application titled ELECTRON EMITTING COMPOSITE BASED ON REGULATED NANO-STRUCTURES AND A COLD ELECTRON SOURCE USING THE COMPOSITE, Ser. No. 60/521,135, filed Feb. 24, 2004.

This application also claims the benefit of U.S. patent application Ser. No. 10/807,890, titled "ELECTRON EMITTING COMPOSITE BASED ON REGULATED NANO-STRUCTURES AND A COLD ELECTRON SOURCE USING THE COMPOSITE," filed Mar. 24, 2004.

BACKGROUND OF INVENTION

The present invention relates generally to the emission of electrons from nano-structured materials and more particularly to the controlled emission of electrons from a cold electron source using nano-structures as the emitters.

It is a long strived for goal of various applications to use a cold electron source that can be modulated by low applied voltage, is highly uniform, addressable with high resolution, capable of generating high current density and has a collimated beam and long lifetime.

A cold electron source operates in a vacuum environment, where an electrical field is applied to an emitter to generate electrons. The emitter is connected to a negative cathode electrode. A positive gate or anode electrode extracts electrons from the emitter through a vacuum gap. In order for emission to occur, a field on the order of $5 \times 10^9$ V/m is required. A common scheme to induce emission with a reduced external field is to use a low work function material for the emitter and to enhance the local field at the emitter by sharpening it to a high aspect ratio. The higher the aspect ratio is, the lower the threshold field, generated from the electrodes, is for an emitter to emit electrons.

With a given emitter, the closer the gate is to the cathode, the lower the voltage that is required to modulate the emission. In order to achieve a modulation voltage of 10 V, the distance has to be close to one micrometer. Only a gate that is integrated onto the substrate by micro-fabrication can meet this requirement. And only this type of integrally gated electron source that is suitable for many applications and can achieve reasonable energy efficiency and be modulated by inexpensive and small COMS drivers.

The widest known field emission electron source is the Spindt type field emitter, where a conical or pyramid microtip of high aspect ratio is used as an emitter. The high cost and low yield associated with its fabrication process, and the high susceptibility of the tip to contamination and ion bombardment have effectively prevented this technology from wide application.

Recently, various nano-structures, such as nano-tubes and nano-wires, have been successfully synthesized. They are typically a few tens of nanometer in diameter and a few micrometers in length, thus a high aspect ratio. One nano-structure that has emerged as the leading candidate for field emitter is carbon nano-tube (CNT). Its extraordinary high electrical and thermal conductivity as well as strong chemical and mechanical stability make it an ideal field emitter. Numerous studies have reported its advantageous emission properties.

There has been great progress achieved in the growth of nano-structures, particularly CNT. It can be grown by various processes with transition metal or compound as catalyst. Through a combined scheme of selective passivation and catalyst application, one can control precisely where the CNT grows. The growth of CNT can be random in direction or aligned vertically to the surface. The spacing between aligned CNT and the tube diameter are largely determined and can be controlled by the catalytic particle spacing, size, and catalyst film thickness. Highly oriented and regularly spaced nano-tube or nano-wire arrays can also be grown on a template surface with pre-etched nano-pores. In summary, the growth of nano-structures, particularly CNT, has reached a high degree of controllability.

Despite the advantageous field emission properties of a single CNT and the ease of growing CNTs in abundance, a densely populated CNT forest can hardly emit any electrons, dashing the hope that such a CNT array would make a practical electron source with high emission site and current densities over large areas. The result has been attributed to the electrostatic screen effect between CNTs. The presence of neighboring CNTs reduces the field penetration down into the CNT film and counter acts the field enhancement factor derived from the high aspect ratio at the CNT tips. Even for a growth with a relatively lower density, where electrostatic effect is negligible, there is an ever-existing variation between CNTs in their height and apex. Those that have a higher aspect ratio and are closer to the extracting electrode experience a higher local field and always emit first, preventing the adjacent ones to do the same.

As a result, the hope of deriving an electron source of high emission site density from a vertically aligned CNT array has largely unfulfilled. Alternatively, a randomly oriented CNT film has provided a better solution. Emission is believed to result from those tips that protrude from the surface. There are two ways to apply these random oriented CNTs to a surface. One is to grow them on the surface. Two major problems plague these random CNT films. First, emission is inhomogeneous and often dominated by strong sites so that the emission site density is still relatively low despite of improvement over vertically aligned CNTs. Second, it is difficult to fabricate a gate electrode on top of these films without degrading their emission properties. The emitter cannot, therefore, be modulated with low voltage even though the film has a low threshold field. A conductive grid is often mechanically mounted on top of these films to modulate electron emission. A typical distance from the grid to the emitting film is 100 pm. Such a large distance results in high driving voltage, and the emission from underneath the grid goes directly to the grid without contributing to the output current. The difficulty in accurately and uniformly mounting and maintaining a fine grid over large area with a small gap is another hurdle. The second way to apply random CNTs to a surface is to mix pre-fabricated CNT with a conductive paste and then screen print them onto a surface, or mix the CNT with an organic resin and spin the mixture onto the surface. This approach has been more widely adopted for the advantages of low cost and not having to expose the substrate to the high temperature of CNT growth. However, the emission performance from these films is worse than when the film is directly grown on the surface. Although it is possible to pre-fabricate a gate electrode on the substrate before screen print the CNT paste, the gate distance has to be sufficiently large to prevent the conductive paste and CNT from shorting the electrodes. The electron beams generated from both types of the emitter are also highly divergent due to the random directions in which the CNT emit.

Integrally gated CNT field emission electron sources by conventional micro-fabrication have also been reported. Apertures are formed in the gate electrode and aligned to the emitter for a low driving voltage. A bunch of CNTs were then directly grown into the gate hole without further processing. However, there exist large variations among the CNTs, both in the same gate hole as well as from gate hole to gate hole, in their length (thus tip-to-gate distance) and aspect ratios. Such variation, plus the electrostatic screening effect between CNTs in the same gate hole, causes an emission dominated by the ones closer to the gate in each gate hole, and changes the emission threshold field from gate hole to gate hole, resulting in a source of little practical use.

In another type of integrally gated device, there was only one CNT in each gate hole, and the CNTs were at least 5 μm apart. The device still does not address the problem of a varying CNT in its height and aspect ratio in each gate hole and there is little emitter redundancy built in. If one CNT is missing or is not grown properly, which happens often, there would be no emission within 100 μm$^2$. Also, due to the large inter-tube spacing, CNT grow thick, reducing the aspect ratio and therefore increasing the driving voltage.

It should also be pointed out that one of the most common and persistent problems that plagues the fabrication of all types of gated field emitter, whether it is micro-tip or nano-structure type, is the tip-to-gate or cathode-to-gate shorting. To use fully exposed conductive nano-structures as emitters, as are with all the prior art, the uncontrolled length and their fragility can cause serious electrical shorting problems during fabrication and operation. Nano-structures also tend to stick together, to the wall of the gate hole or to the substrate surface upon exposure to moisture or a wet process due to electrostatic force, diminishing their emission performance. Full exposure also subjects the nano-structures to greater ion bombardment during operation, causing faster emitter erosion and re-deposition of the conductive material, and, therefore, shorter lifetime and further possibility of shorting electrodes.

SUMMARY OF INVENTION

It is an objective of the current invention to: a) provide a means for inducing a greater and consistent local field enhancement at the emitting tip to counteract the electrostatic screening effect between densely packed nano-structures, b) for minimizing the variation in tip-to-gate distance and tip apex for each potential emitter in the array, c) for eliminating the divergence of the emitting directions, and d) for enabling many nano-structures that are most desirable and yet previously not feasible for use as field emitters. It is another objective of the invention to provide an electron source using nano-structures as emitter that: a) is integrally gated in order to modulate at a low voltage, b) is of high emission site and current density, c) is substantially collimated, d) is able to sustain severe ion bombardment, e) has consistent emission performance and long lifetime, and f) is easy to fabricate with high production yield.

An important aspect of the invention is an emitter layer that includes one or an array of nano-structures, CNT for example, embedded in a matrix material. The tip of the nano-structure is truncated and exposed at the surface of the emitter layer, and kept parallel to the cathode and gate electrode. The embedding material forms triple junction with the nano-structure, and vacuum space at the surface of the emitter layer. A triple junction is defined as a contact between a conductor, an insulator or a wide-gap semiconductor, and a vacuum space. At the junction, local electric field can become so high that electrons readily tunnel through barrier and inject into vacuum. Formation of such a triple junction is another major mechanism of enhancing local field other than by the geometric factor of high aspect ratio. Examples of such mechanism at work include the frequently observed flashover near the triple junction in vacuum electron beam devices. Since the nano-structure array is truncated at the surface of the emitter layer, each one of the potential emitters is kept at the same distance from the gate electrode and the same direction perpendicular to the emitting surface. The wall of a nano-tube is also sharper than its tip radius. Therefore, the truncated nano-tips not only have a regulated apex, but also have a higher aspect ratio and hence a higher field enhancement. The combined effect of triple junction and a higher aspect ratio counteracts with the electrostatic effect among CNTs, allowing higher packing density of the nano-structures and still keeping low the threshold field for the emitter. Because both the triple junction effect and the tip aspect ratio change little with the tip erosion from ion bombardment, the field enhancement factor for each tip is expected to be consistent throughout its lifetime. A field emitter of such characteristic is expected to have a long lifetime and steady performance. Furthermore, the solid and smooth surface of the emitter layer allows easy fabrication of an integrated gate electrode for the purpose of low voltage emission modulation.

In accordance with one embodiment of the present invention, the electron source includes a substrate, a cathode, an emitter layer, an insulator, and a gate electrode. The cathode is disposed over the substrate and provides, in operation, a source of electrons. The emitter layer is disposed over the cathode and is formed from a composition of a dielectric embedding material and a plurality of conductive nanostructures embedded therein. The emitter layer has a surface at which ends of the nano-structures are truncated and exposed for emitting electrons. The insulator is disposed over the emitter layer and has a plurality of apertures for exposing the ends of the nano-structures. The gate electrode is disposed over the insulator and has a plurality of apertures that are aligned with the apertures in the insulator. The gate electrode, in operation, controls the emission of electrons through the apertures from the exposed nano-structures. When an electrical field is applied between the electrodes, the gate extracts electrons from the emitter layer through a vacuum gap.

Since the emitter is embedded in an insulator and the gate electrode is further insulated from the emitter layer, the chance for shorting between the gate and the cathode, as well as between gate and the emitting tip is substantially decreased, resulting in a much higher fabrication yield.

When multiple cathodes, each electrically independent, and multiple gate electrodes, each electrically independent and intersects with the multiple cathodes, are used, an addressable, planar electron source is formed.

The nano-structure is defined as anything that has at least one dimension that is in the nanometer scales. Examples are nano-tube, nano-wire, nano-plane, nano-fiber, nano-cone, and nano-particles.

The conductive nano-structure includes those made of conductive material and those of an insulator core and a conductive shell. To ensure sufficient electrical contact of the emitter with the cathode, these nano-structures need to be grown on the substrate.

The embedding insulator is defined as any solid material that insulates the nano-structures from each other. It includes those made of a single insulating material and those of multiple layers of different materials.

Another embodiment of the emitter layer is to embed an insulator nano-structure in a conductive matrix. Alone, these nano-structures cannot be used as emitters because of their insulating nature. The conducting matrix forms triple junction with the insulator nano-structure at the surface of the emitter layer. Due to enhanced local field at the junction, electrons tunnel from the matrix through the exposed and truncated nano-tip at the emitting surface directly into vacuum space. There are additional advantages to the embodiment. First, since the embedding matrix provides electrical conduction from the cathode to the nano-structure, the emitter does not have to have a physical contact with the cathode. As a result, pre-fabricated nano-structures can be dispersed in a conductive medium and then deposited onto the cathode, and, nano-particles can be used as emitter as well. Second, nano-structures made of wide gap semiconductors, such as diamond, BN and AlN, that have the most desirable emission properties of low work function, superb thermal conductivity, high chemical and mechanical stability, and robust to ion bombardment, can be used as emitters. Nano-particles of these wide-band-gap materials are already abundant. Growth of BN nano-tubes has also been widely reported. Third, the conductive matrix can effectively spread the heat away from the emitter, further extending its lifetime. Although there is no need to regulate the length of nano-particles, the emitter layer in the current invention, still allows one to regulate their emission direction. By embedding them in a conductive matrix, the current invention provides a means to enhance their local field and an effective path to electrical and thermal conduction, as well as a way to assemble and adhere them to the substrate.

Using pre-fabricated nano-structures has some unique advantages. Not only is the material and processing much cheaper, and there are a large quantity and variety available, but also it leaves tremendous flexibility to the fabrication of an electron source. The nano-structures can be applied to a substrate in many ways. First, they can be uniformly dispersed in such precursor solutions as of conductive oxides, or colloidal suspension of a conductive composite, and applied onto a substrate by spinning or dipping. When the precursor solution or suspension is cured or condensed at high temperature or by UV illumination, a conductive solid matrix and the nano-structures fuse together forming the emitter layer. Second, they can be first dispersed in a slurry composed of a conductive material, (conductive ceramic, metal or carbon particles for instance), and organic or ceramic binders (glass frit for instance), surfactants, solvent and additives, and then applied to the substrate as a film by printing, doctor blade or extrusion coating. After the film is dried, organic additives burned off and the film heated or sintered at high temperature, a composite film forms with nano-structures embedded in a metal or a conductive composite matrix. CMP or an etch back is then applied to the surface of these films to expose the nano-structures.

A thick composite film of hundreds of micrometers or even a freestanding composite slab can be formed by the second method. These composites are particularly suitable for high power applications, being able to withstand severe ion bombard. They are also suitable for large area planar illumination since they can be produced inexpensively and conveniently in large quantity. Such a free standing emitting slab can be used to build an electron source without the need of a substrate and cathode electrode layer.

Embedding wide gap semiconductor nano-structures in an electrically and thermally conductive matrix of high thermal and chemical stability and low ion sputter yield, as are some conductive oxides and conductive composite, is the most desirable material combination for a field emitter.

A further embodiment of the emitter layer is to embed a conductive nano-structure in a conductive matrix. The embodiment is similar to the one described above in that a pre-made nano-structure can also be utilized, and a thick film or freestanding emitting composite can be made. There may not be the benefit of additional field enhancement from the formation of triple junction between the nano-structure and the embedding matrix. It, therefore, may seem advantageous to coat or grow a layer of insulating material outside of these nano-structures before embedding them in the conductive matrix. However, when the embedding material is a conductive composite of conductive particles, such as graphitic carbon, dispersed in a nonconductive matrix, such as glass, the conductive particles provide the conduction between the emitting nano-structures and the cathode, while the nonconductive glass may still form triple junction with the nano-structures at the emitting surfaces. A special case of this scenario is a high volume percent of pre-fabricated conductive nano-structure mixed with a nonconductive material, where some of the internally embedded conductive nano-structures provide electrical contact to others that are exposed at the surface of the emitter layer.

It should also be pointed out that even without the benefit of triple junction field enhancement, the embodiment still regulates the length, apex, and emitting direction of the embedded nano-structures, and, therefore, is still superior to the prior art in which the CNTs are dispersed in a conductive medium and then screen-printed or spun onto the substrate.

The desired material characteristics for the nano-structure as an emitter include. a) low work function for reduced emission threshold field, b) excellent thermal conductivity, c) high thermal stability, d) strong chemical and mechanical stability, e) good electrical conductivity if the embedding matrix is not conductive, and f) resistance to ion sputtering. Typical conductive nano-structure materials include, but are not limited to: carbon, such as CNT; refractory metals, such as Mo and W; doped semiconductors, such as p or n type Si or GaAs; Conductive ceramics, such as Indium Tin Oxide (ITO), or a combination of the above. Typical insulator nano-structure materials include: wide band-gap semiconductors, such as diamond, AlGaN, AlN, BN and SiC; semiconductors such as undoped GaAs or Si; oxides, such as $ZrO_2$ and $Al_2O_3$; nitrides, such as $Si_3N_4$; carbides, such as HfC, and ZrC; or a combination of the above. The nano-structures can be multi-layered. It is particularly advantageous for the nano-structure to have an alternating conducting-and-insulating layer, with each interface forming a triple junction at the exposed tip.

The following material characteristics are the major factors in selecting an embedding material: a) excellent thermal conductivity, b) strong chemical and mechanical stability, and c) low ion sputtering yield. Typical embedding insulators include, but not limited to, ferroelectric materials, such as $BaTiO_3$; oxides, such as $Al_2O_3$, $ZrO_2$, $Ta_2O_5$, and $SiO_2$: Nitrides, such as AlN, GaN, c-BN, $Si_3N_4$; carbides, such as SiC, WC, ZrC; diamond; diamond-like carbon; un-doped semiconductors, such as Si, GaAs; insulating ceramics, glasses, organically modified glasses, insulating composites; and cured organic resins. Typical embedding conductive materials include, but are not limited to: metals, such as Mo, W, and their alloys; doped semiconductors, such as doped amorphous or polycrystalline Si; conductive ceramics, such as $CrO_2$ and Indium-Tin-Oxide (ITO); conductive polymeric or ceramic composites, such as carbon dispersed in glass or silver dispersed in epoxy.

The embedding material can be applied to the surface by chemical or physical vapor depositions, sol-gel processes, printing, or other liquid-film coating and curing or condensing processes, such as Metal Organic Decomposition (MOD) or a combination of the above. It is sometimes advantageous to apply a layer of embedding material by a vapor deposition process, such as thermal evaporation or chemical vapor deposition (CVD), and to apply second layer of embedding material with liquid coating and curing or condensation processes. Depending on the selected material, a third layer can further be applied by a vapor deposition process.

It can be advantageous for either the nano-structure or the embedding matrix, or the both, to be made of a combination of materials for the purpose of tailoring their electronic, electrical, mechanical, chemical, and thermal properties to the optimum or for the easiness of fabrication. The materials adjustment can be stepwise or at atomic level.

For some applications, it is advantageous to have the nano-tips slightly recessed into the embedding matrix surface. This way, the section of the hollow wall formed above the nano-tip can act as a focusing lens for the electrons emitted from the emitting tips or as a shield to protect the nano-structure from direct ion bombardment.

Yet, for other applications, it is advantageous to have the nano-tips slightly protruding from the embedding matrix to prevent charging from building up in the embedding insulator matrix.

The surface of the emitter layer can be treated to modify the exposed tips of the nano-structure for a better or more reliable emission performance. Such treatment includes, plasma treatments, UV radiation, thermal annealing, and other chemical processes.

To achieve even higher emission uniformity, a ballast resistor layer can be inserted between the cathode electrode and the emitter layer.

The cathode, emitter layer and the gate can also be arranged laterally, in which the cathode and the emitter layer are in contact with each other by their sides, and the gate electrode faces the emitter layer. The preferred embodiment for this configuration is to selectively grow horizontally oriented CNT on the appropriate sidewall of the cathode. The advantage of this configuration is that it ensures an equal tip-to-gate distance for each nano-tip without resorting to sophisticated photolithography processes. Also, the emitters are not facing directly the pathway of high-energy ions.

The source of the current invention can be simplified to include a substrate, the first conductive cathode electrode and the emitter layer on the substrate, and be operated by either mounting a conductive grid on top to modulate electron emission, or in a diode mode, where an anode mounted in a distance is used to modulates and accelerates the electrons. Another simplified embodiment of the source comprises only an emitter layer on a conductive substrate, where the conductive substrate serves also as the cathode electrode. A further simplification of the source is to include only a slab of a conductive and freestanding emitting composite, as is described above. The slab functions as the substrate, cathode electrode and the emitter layer.

For the purpose of further focusing, deflecting or scanning the electron beam, The source of the current invention can include one or more additional integrated electrodes, each insulated by another insulating layer and having apertures, both in the electrode and its insulator, aligned to those in the gate electrode and the first insulator layer.

One advantage of the present invention is that an integrated gate electrode can be conveniently built on top of the fragile nano-structures.

Another advantage is that a lower modulation voltage is derived from the integrated gate structure and additional field enhancement at the emitting tip from the formation of triple junctions and higher aspect ratio.

Yet another advantage is that a higher emission site and current density are derived from the higher density of nano-structures embedded in a matrix with substantially equalized tip to gate distance and tip apex.

Other advantages include: (a) a higher degree of collimation of the electron beam derived from regulated emission direction from each emitter; (b) longer lifetime and consistent emission performance derived from a consistent local electrical field at each emitting tip as the tip erodes from ion bombardment, mechanical protection, thermal and electrical conduction enhancement from the embedding matrix, and lower ion sputter yields of the selected nano-structure and embedding materials; and (c) a higher production yield and an increase in ease of fabrication derived from embedding the nano-structure in an insulating matrix and protection of the nano-structure from the matrix.

BRIEF DESCRIPTION OF DRAWINGS

The accompanying drawings, which are incorporated in and form a part of this specification, illustrate embodiments of the invention and, together with the description, serve to explain the principles of the invention:

FIG. 1A shows a section view from the front; and

FIG. 1B shows a top view;

FIGS. 2A-2G illustrate the fabrication steps of a preferred embodiment of the current invention;

FIG. 2A shows a substrate;

FIG. 2B shows the deposition of cathode metal and catalyst;

FIG. 2C shows the growth of CNT;

FIG. 2D shows the deposition of an embedding insulator;

FIG. 2E shows the formation of the emitter layer by polish;

FIG. 2F shows the deposition of a gate insulator and gate metal; and

FIG. 2G shows formation of gate aperture.

FIGS. 3A-3C show a grown conductive nano-structure embedded in an insulating matrix;

FIG. 3A shows a conductive grown nano-structures embedded in an insulating matrix;

FIG. 3B shows a grown nano-structure with an insulator core and a conductive shell embedded in an insulating matrix; and FIG. 3C illustrates a nano-structure with an insulator core and a conductive shell;

FIGS. 3D-3G shows insulator nano-structures embedded in a conductive matrix;

FIG. 3D shows a grown insulator nano-structure embedded in a conductive matrix;

FIG. 3E shows a pre-made insulator nano-structure embedded in conductive matrix;

FIG. 3F shows an insulator nano-particles embedded in a conductive matrix; and

FIG. 3G shows a detail of the emitter layer shown in FIG. 3F.

FIGS. 3H-3I shows conductive nano-structures embedded in a conductive matrix;

FIG. 3H shows grown conductive nano-structure embedded in a conductive matrix; and FIG. 3I shows pre-made nano-structure embedded in a conductive matrix;

FIG. 4A shows a nano-tip slightly recessed from the surface of the embedding matrix;

FIG. 4B shows a nano-tip that slightly protrudes from the surface of the embedding matrix; and FIG. 4C shows a nano-tip at the same surface level as of the embedding matrix;

FIG. 5A shows a section view from the front;

FIG. 5B shows a section view from the left;

FIG. 7A sets for the main steps for fabricating an electron source;

FIG. 7B sets forth the steps of a first alternative for depositing the emitter layer;

FIG. 7C sets forth the steps of a second alternative for depositing the emitter layer; and FIG. 7D sets forth the steps of a third alternative for depositing the emitter layer.

Figure 1A:
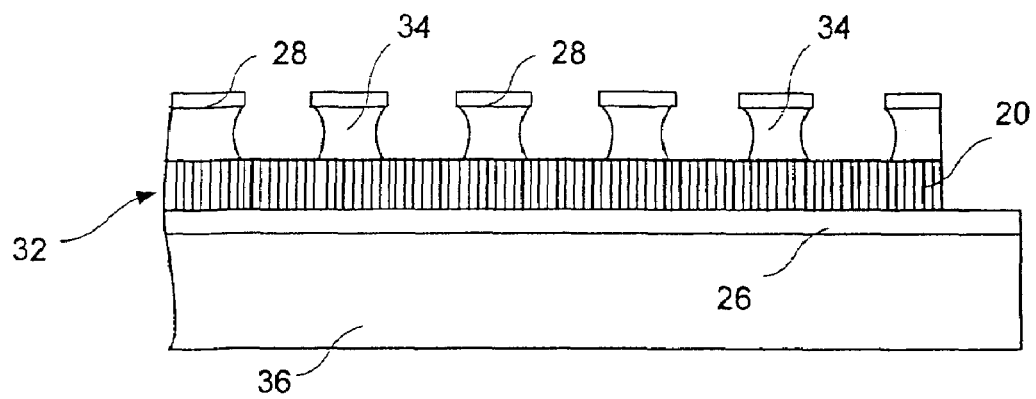
FIGS. 1A-1B show an electron source from the current invention.

Reference designators used herein are: 20—CNT, 22—nano-tip, 26—cathode electrode, 28—gate electrode, 30—gate aperture, 32—composite emitter layer, 34—gate insulator, 36—substrate, 38—conductive nano-structure directly grown on the substrate, 40—insulating embedding matrix, 42—insulator nano-structure directly grown on the substrate, 44—pre-fabricated insulator nano-structure, 46—conductive embedding matrix, 48—pre-made nonconductive nano-particles, 50—pre-made conductive nanostructure, 52—catalyst, 54—nano-structure, 56—embedding matrix, 58—insulating core of a nano-structure, 60—conductive shell of a nano-structure, 62—composite nano-structure with alternating insulating-to-conductive layers.

DETAILED DESCRIPTION

FIG. 1 illustrates an electron source by current invention using vertically aligned CNT 20. It includes a substrate 36, a cathode 26 deposited on the substrate, an emitter layer 32, a gate electrode 28 insulated from the emitter layer by a gate insulator 34. Apertures 30 are opened in the gate electrode and gate insulator to extract electrons from the exposed CNT tips in the emitter layer 32.

FIG. 2 depicts one of possible fabrication process flows for the source shown in FIG. 1. The process starts with a substrate 36 shown in FIG. 2A. Examples are Si or glass. A first conductive cathode layer 26 and a thin catalyst layer 52 are then deposited, as is shown in FIG. 2B. Examples of the first conductive layer and catalyst are Cr and Ni respectively. The conductive layer should be chosen so that it does not prohibit CNT growth with the presence of catalyst. The catalyst layer is made of many Ni dots of nanometer size. An array of vertically aligned CNT 20 is then grown, as shown in FIG. 2C, on the catalyst 52. Preferably, the CNTs have a diameter less than 100 nm, wall thickness less than 30 nm, spacing less than 5 µm and a length less than 5 µm. A conformal layer of insulator 40, $Ta_2O_5$ for instance, is then deposited, shown in FIG. 2D, to embed the CNT. Chemical-mechanical planarization (CMP) is then applied, shown in FIG. 2E, to remove and polish the non-uniform part of the surface until CNTs are truncated and their tips are exposed, forming the composite emitter layer 32 of about one or a few µm thickness. In order to control the polish uniformity, an "etch stopper" can, optionally, be deposited and patterned before the polishing. A gate insulator 34 and a gate electrode layer 28, $SiO_2$ and Cr, respectively for instance, are then deposited, as is shown in FIG. 2F. The thickness of $SiO_2$ is preferred to be comparable to the diameter of the gate aperture to ensure that distances of each nano-tip inside to the edge of the aperture are not significantly different and yet the modulation voltage at the gate will remain low. Gate apertures 30 are then formed in the gate electrode 28, shown in FIG. 2G, through the gate insulator 34 until nano-tips 22 in the emitter layer are exposed. The embedding dielectric can be deposited by MOD process, or reactive sputter. In case a thick embedding layer is needed, one can apply a relatively thin layer, 300 nm, for example, of $Ta_2O_5$ first by either MOD or reactive sputter and then a spin-on material, such as an organically modified spin-on-glass (SOG), for the remaining embedding layer, or to sandwich the SOG in between two layers of $Ta_2O_5$.

There can be many embodiments for the emitter layer described above. FIGS. 3A through 3I depict three types of embodiments. Selection depends on the desired device performance, process and material compatibility, and fabrication cost.

Figure 3A:
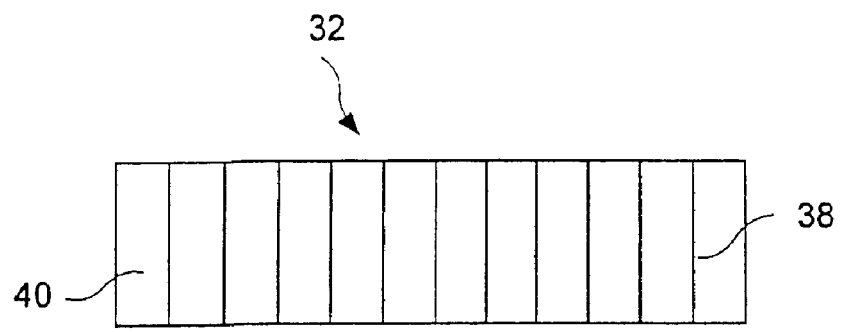
FIGS. 3A-3I show three types of embodiments of an emitter layer.
Figure 3B:
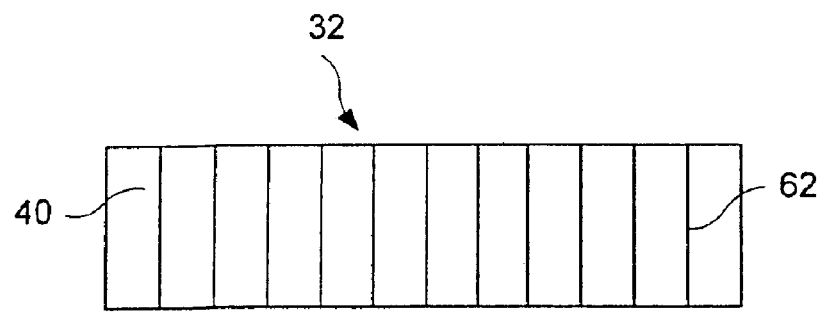
Figure 3C:
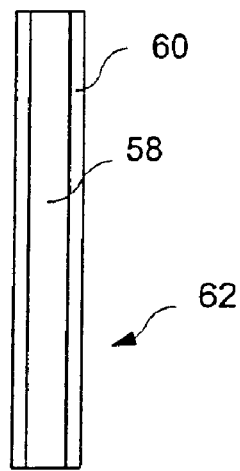

Referring to FIGS. 3A through 3C, one or an array of conductive nano-structures 38, grown directly on the substrate, is embedded in an insulating matrix 40. The nano-structure can be made either of entirely conductive material, such as CNT and W nanowire, as shown in FIG. 3A, or of an insulator core 58 and a conductive shell 60, such as a GaN nano-wire with a W shell, as is shown in FIG. 3C. The composite nanostructure 62 can even be made of multiple alternating insulating-and-conductive layers to fit to the needs of a good field emitter. Since the nano-structures themselves have to carry electrons from the cathode to the emitting tips, they have to have a strong electrical contact to the cathode. Therefore, they need to be grown directly on the substrate. Aligned growth with a controlled spacing between the structures is preferred, as is shown in the figures. However, it is also possible to use randomly grown structures provided that they don't cause cross talk between cathodes in an addressable source and there is a reasonably uniform distribution of the nano-tips in the resulting emitter layer.

Figure 3D:
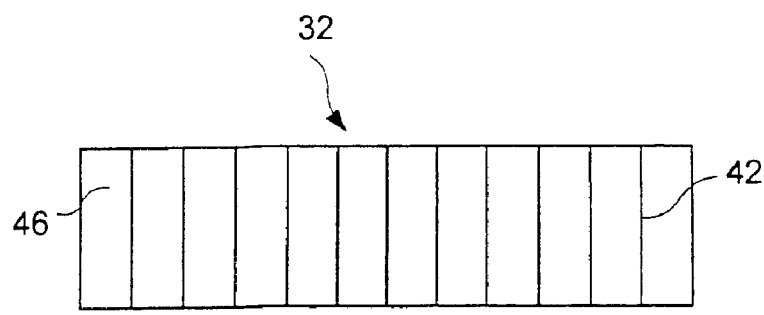
Figure 3E:
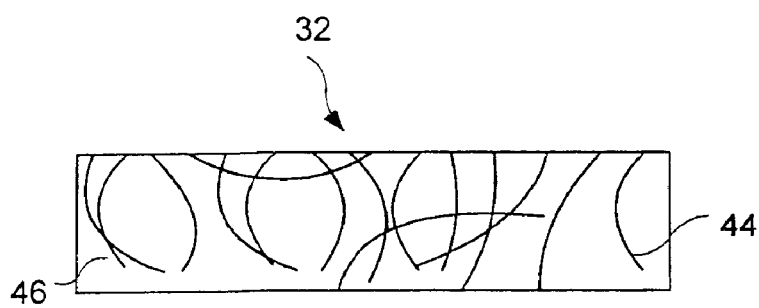
Figure 3F:
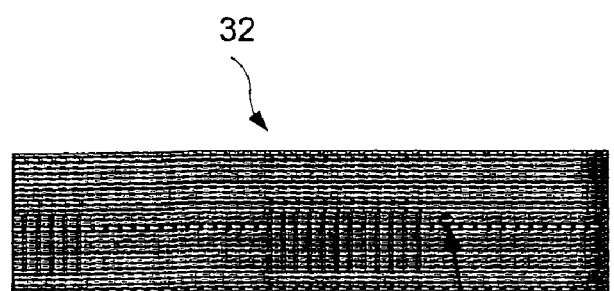
Figure 3G:
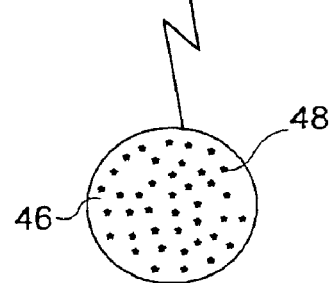

FIGS. 3D through 3F represent another type of embodiment of the emitter layer, where one or an array of insulator nano-structure is embedded in a conductive matrix. In FIG. 3D, the insulator nano-structure 42 grown directly on the substrate is embedded in a conductive matrix 46. Again, an aligned growth is preferred as is shown in the figure. However, random growth should not be completely excluded. Examples include an array of vertically aligned GaN nano-wires, or BN nano-tubes embedded in $CrO_2$. In FIG. 3E, pre-made insulator nano-structures 50 are embedded in a conductive matrix 46. These nano-structures can be first dispersed in a medium, such as a slurry containing carbon or conductive ceramics particles, or a conductive oxide precursor solution, and then applied to the surface by printing or spin coating. The film applied to the surface as such is then dried and condensed, or burned off and heated or sintered at a higher temperature, forming the composite emitter layer. Examples of the embodiment are AlN or other wide band gap semiconductor nano-wires embedded in a conductive composite of graphitic carbon power dispersed in a glass, or AlN embedded in W. In FIG. 3F pre-made insulator nano-particles 48 are embedded in a conductive matrix 46. FIG. 3G shows the details of the emitter layer in FIG. 3F. Examples of this embodiment are diamond and other wide band gap semiconductor nano-particles embedded in a conductive ceramic, such as ITO, or a conductive composite, such as graphitic carbon dispersed in glasses, or a metal, such as W.

Figure 3H:
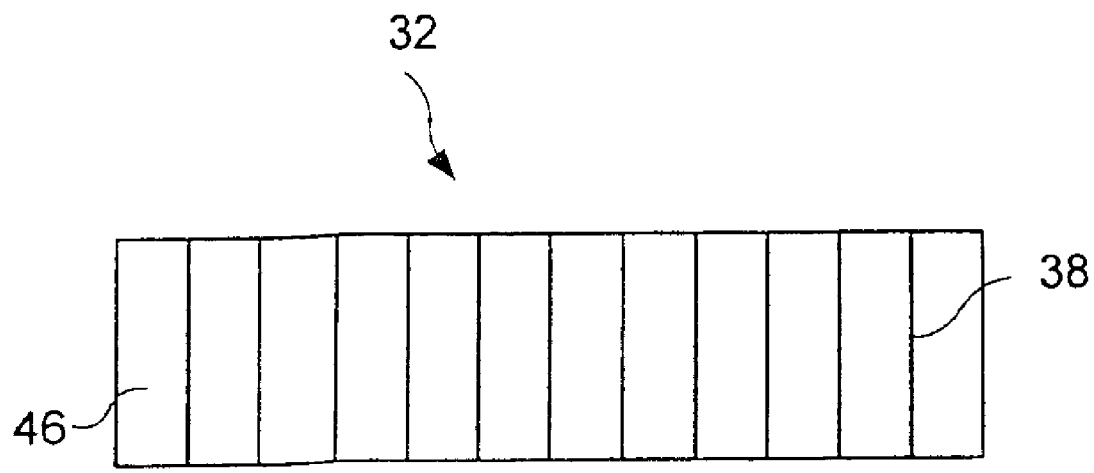
Figure 3I:
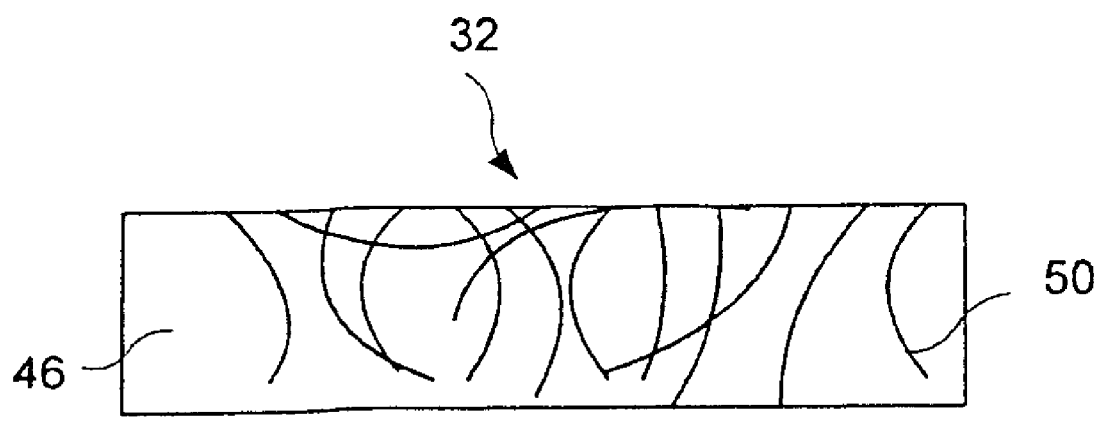

FIGS. 3H and 3I depict the third type of embodiment of the emitter layer, where conductive nano-structures, such as CNT, embedded in a conductive matrix 46. In FIG. 3H, the nano-structures 38 are grown directly on the substrate, while in FIG. 3I, they are pre-made 50.

Figure 4A:
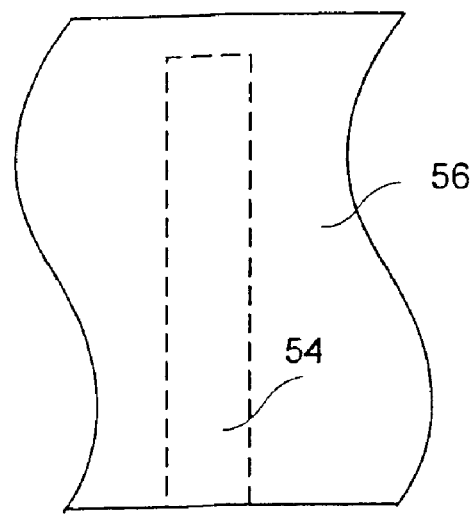
FIGS. 4A-4C show nano-tip positions relative to the surface of an emitter layer.
Figure 4B:
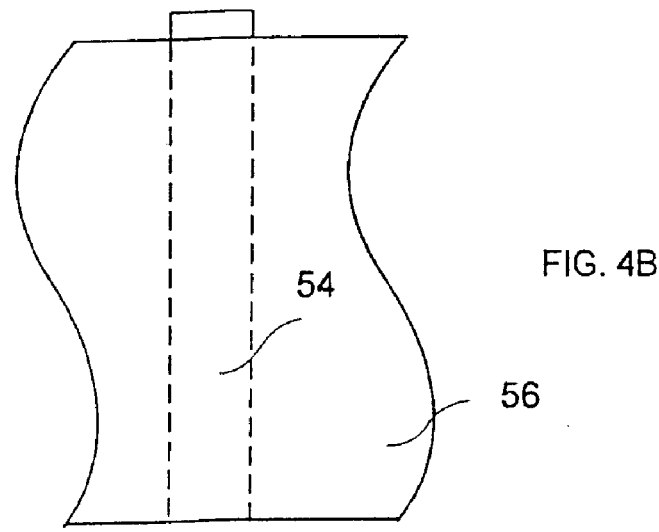
Figure 4C:
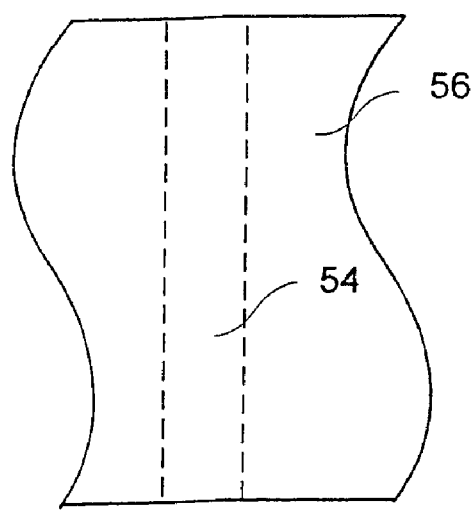

For some applications, it can be advantageous to have the nano-tips slightly recessed, as shown in FIG. 4A, from the embedding matrix to either protect the nano-tip from ion bombardment or to further collimate the electron beam from the emitter by the extra length of the embedding matrix from the emitter tip. For some other applications, it can be advantageous to have the nano-tip protrudes from the embedding matrix, as shown in FIG. 4B, to prevent the matrix from charging. Any one of the wet or dry etch processes known to the skilled in the art could be used for a slight etch back of either the embedding matrix or the nano-tips.

For other applications, it can also be advantageous to treat the surface of the emitter layer for such purposes as introducing a particular atomic bonding to the truncated nano-tips, or for cleaning the exposed nano-tips. Typical processes include plasma treatments, UV radiation, thermal annealing or other chemical treatment. As an example, the surface of an emitter layer with diamond nano-particles embedded in a conductive film is treated with hydrogen plasma to hydrogenate the dangling carbon bond at the surface of the exposed nano-particle. Such hydrogenated diamond surface is believed to have a lower work function, making electron emission easier.

Figure 1B:
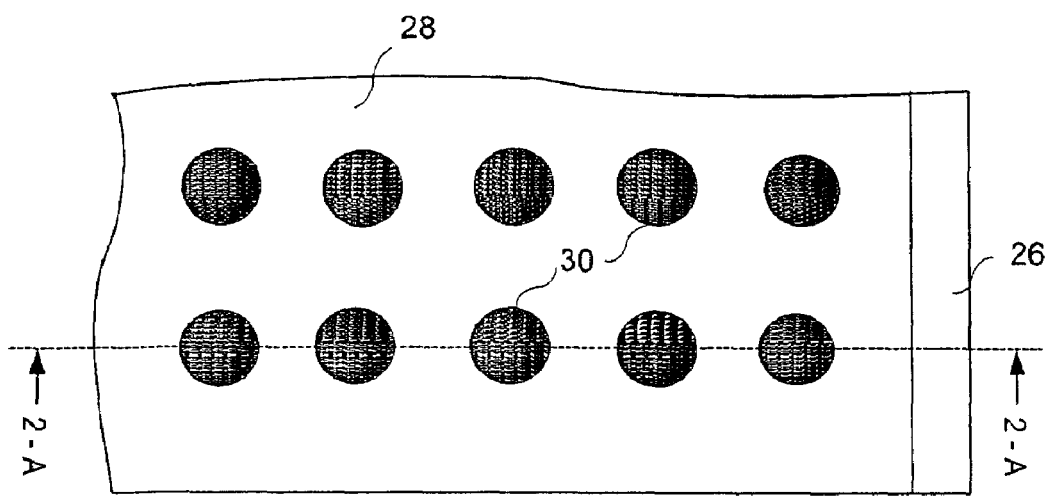
Figure 5A:
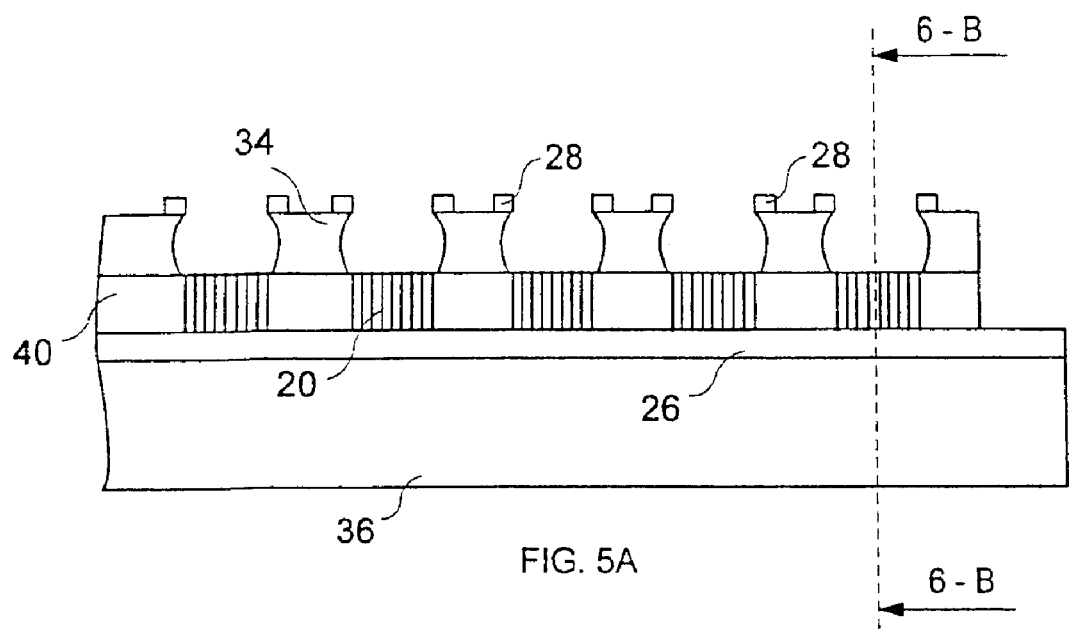
FIGS. 5A-5B show an addressable electron source of present invention.
Figure 5B:
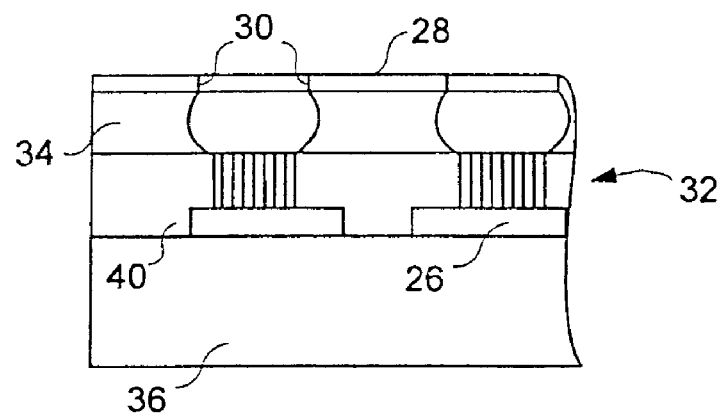

The electron source shown in FIG. 1A and FIG. 1B become addressable when the cathode electrode is configured as multiple parallel rows of electrodes, each supplies an independent source of electrons; the gate electrode is configured as multiple columns of electrodes, each intersects the multiple rows of the cathodes and have one or a plurality of apertures at the intersection that are aligned to the apertures in the insulator to extract electrons. Activation of a selected row of cathode and a selected column of gate electrode determines an intersection that emits electrons. FIG. 5A and FIG. 5B show one of these addressable sources. Although the nano-structures in the figures are shown in patches, they can be distributed over the entire cathode.

Figure 6:
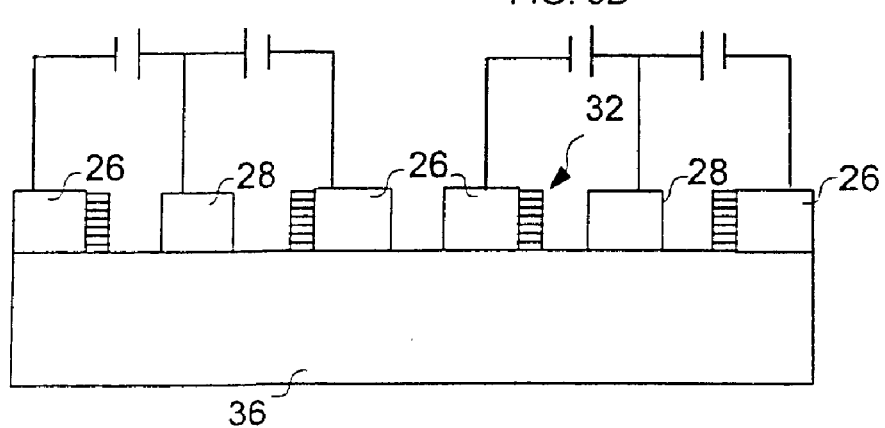
FIG. 6 is an illustration of the current invention with a lateral configuration.
Figure 7A:
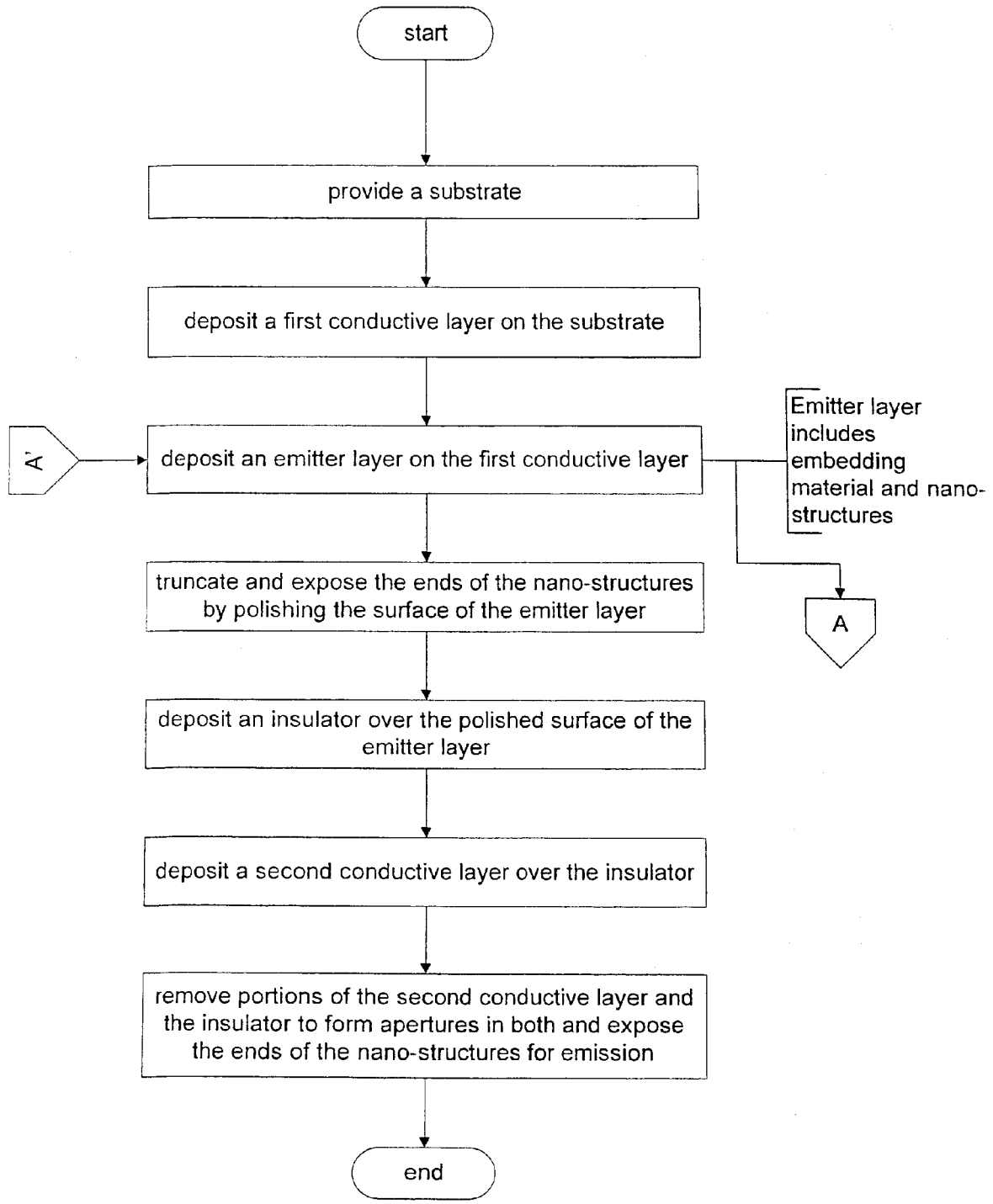
FIGS. 7A -7D are a flow chart setting forth the steps for fabricating an electron source.
Figure 7B:
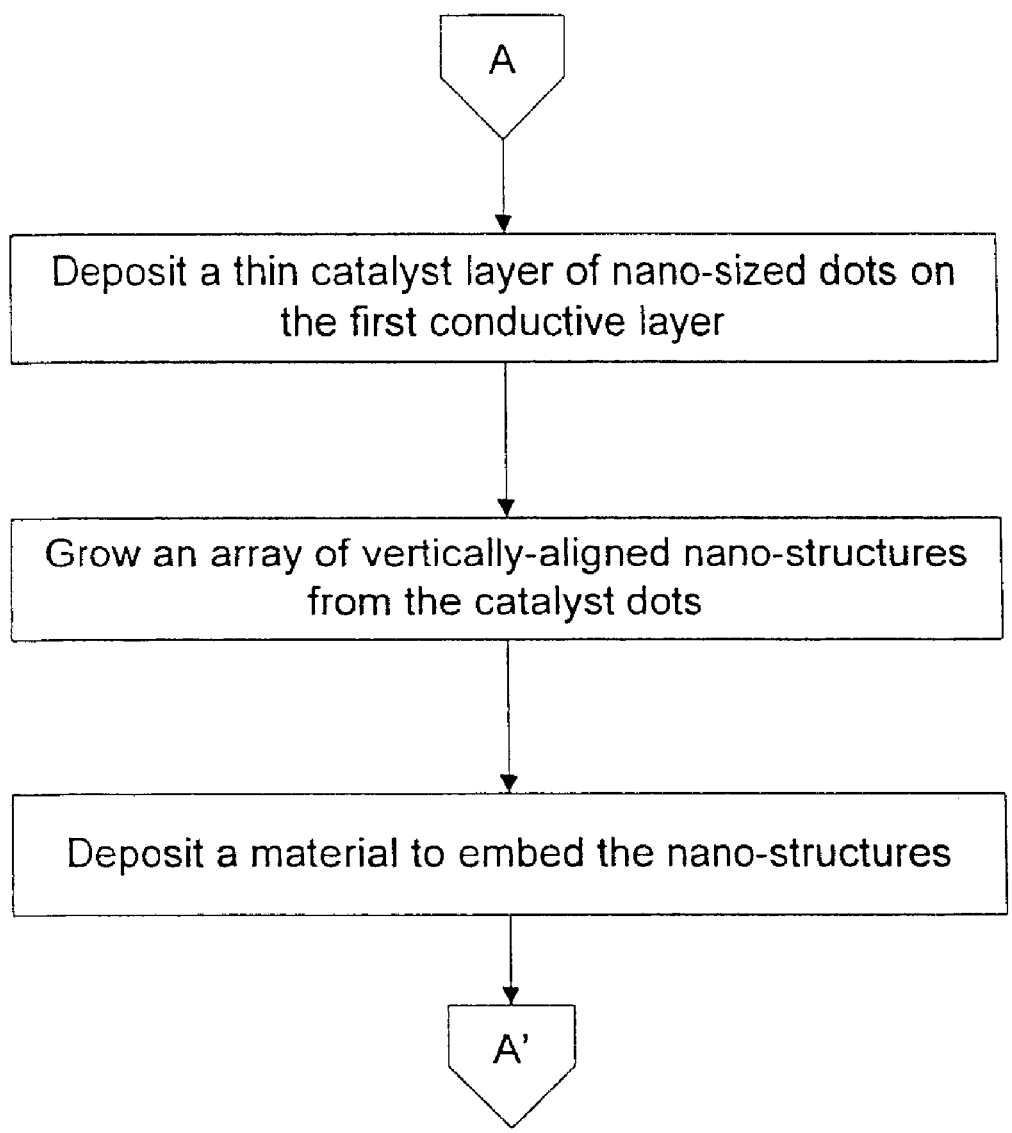
Figure 7C:
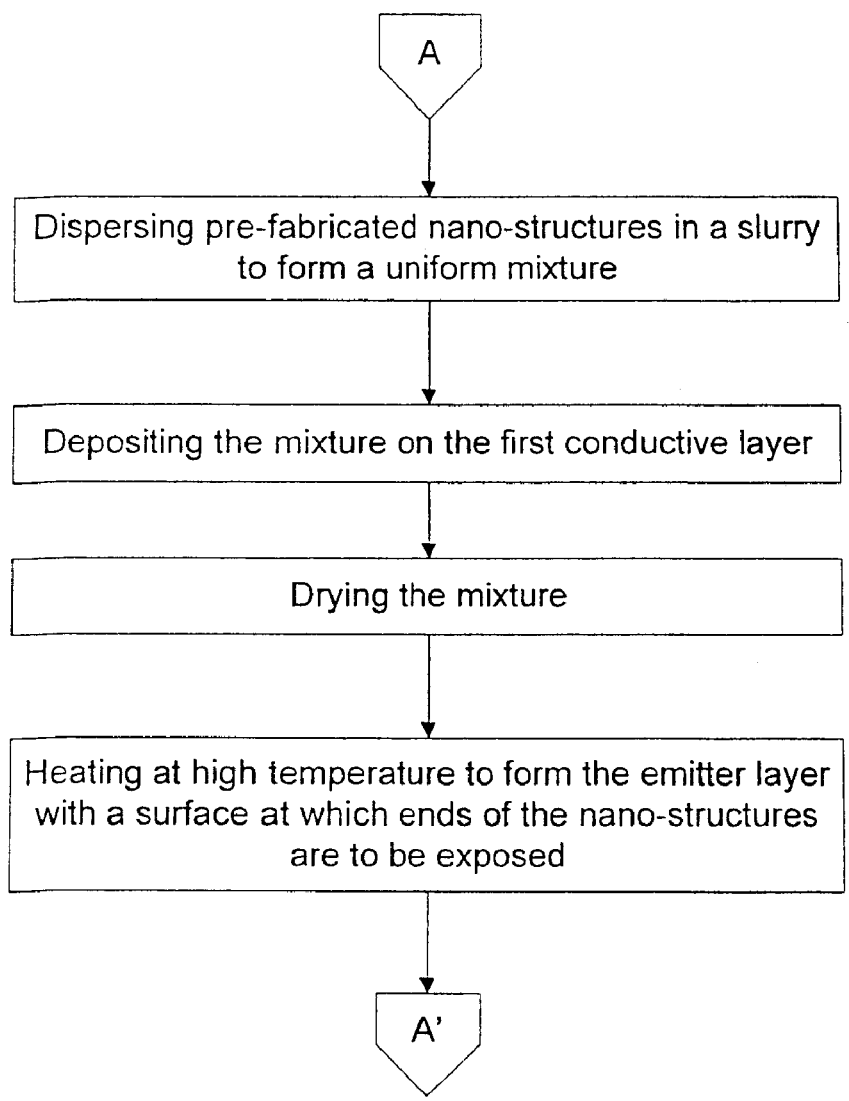
Figure 7D:
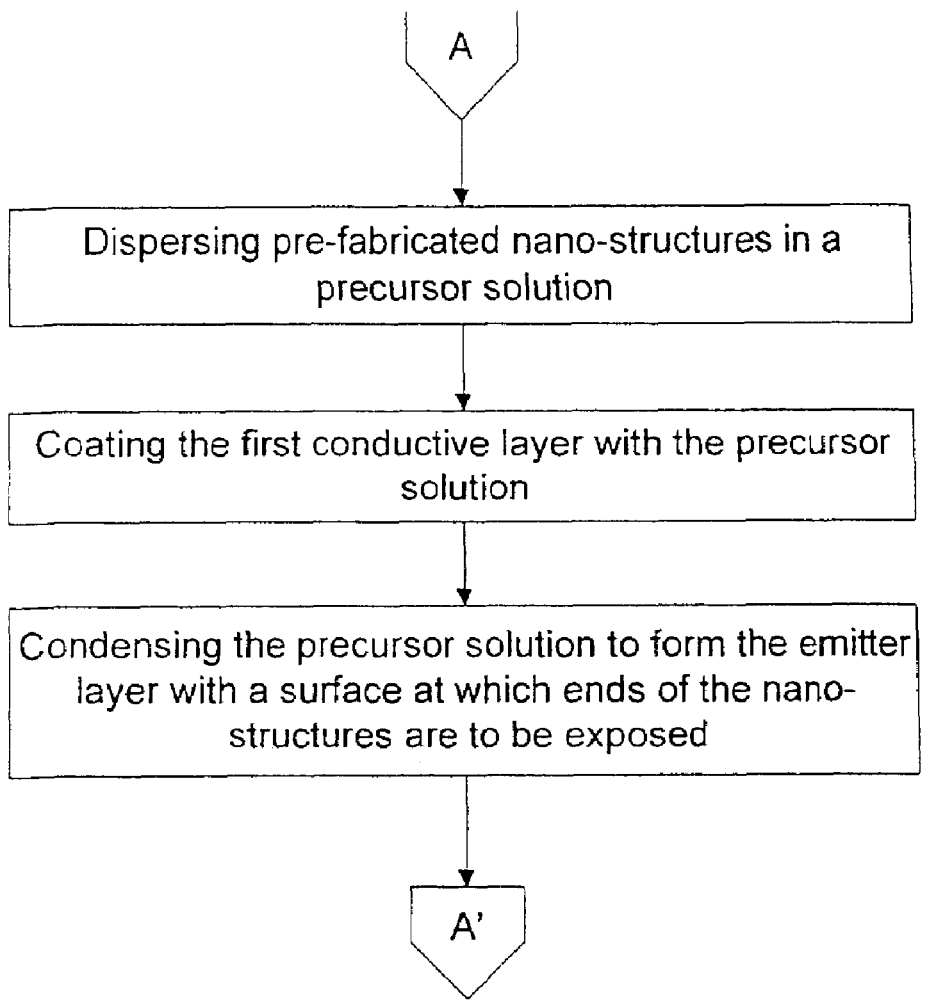

FIG. 6 shows a lateral configuration of the current invention. This configuration has two notable advantages. First, all the nano-tips are kept at exactly the same distance from the gate electrode. Second, the emitter layer does not directly face the high-energy ions in the free space so that the tip erosion from ion bombardment is minimized. For devices such as an x-ray generator, where the ion energy can be as high as 100 keV, this configuration presents a unique way to protect the emitter, especially when the nano-tip is recessed into the embedding matrix.

It is to be understood that the embodiments described above are illustrative of only a few of the many possible specific embodiments that can represent applications of the principles of the invention. Numerous and varied other arrangements can be readily devised by those skilled in the art without departing from the spirit and scope of the invention.

What is claimed is:

1. An electron source comprising:
a substrate;
a cathode disposed over the substrate, the cathode being operable to provide a source of electrons;
an emitter layer disposed over the cathode and formed from a composition of an embedding material and one or a plurality of nano-structures embedded therein, said composition including interfaces between said nano-structures and said embedding material, the emitter layer having a surface at which ends of the nano-structures are truncated, said ends of the nano-structures and said interfaces being exposed to emit electrons;
an insulator disposed over the emitter layer, the insulator having one or a plurality of apertures for exposing said ends and said interfaces; and
a gate electrode disposed over the insulator and having one or a plurality of apertures that are aligned with the apertures in the insulator, the gate electrode being operable to control the emission of electrons through the apertures from the exposed nano-structures at the interfaces, a vacuum space present between the gate electrode and the surface of the emitter layer;
wherein the nano-structures are selected from the group consisting of nano-wire, nano-tube, nano-plane, nano-fiber, nano-cone, and non-diamond nano-particles; and
wherein the exposed end of the nano-structure and the interface are slightly recessed from the surface of the emitter layer.

2. An electron source as recited in claim 1, wherein the nano-structures are conductive and the embedding material is an insulating material.

3. An electron source as recited in claim 2, wherein the insulating material is selected from a group of materials consisting of: ferroelectric materials, oxides, nitrides, carbides, diamond-like carbon, un-doped semiconductors, glasses, organically modified glasses, insulating ceramics and composites, and cured organic resins.

4. An electron source as recited in claim 2, wherein the conductive nano-structures are selected from a group of materials consisting of: non-diamond carbon, doped-semiconductor, refractory metals and alloys, and conductive ceramics.

5. An electron source as recited in claim 4, wherein the non-diamond carbon material is selected from the group consisting of carbon nano-tube, carbon nano-fiber, carbon nano-cone, carbon nano-particle, and carbon nano-plane.

6. An electron source as recited in claim 1, wherein the embedding material is conductive and nano-structures are insulators.

7. An electron source as recited in claim 6, wherein the insulator nano-structures are selected from a group consisting of: non-diamond wide band gap semiconductors, oxides, carbides, nitrides, and undoped semiconductors.

8. An electron source as recited in claim 7, wherein the non-diamond wide-band semiconductors are selected from the group consisting of BN, GaN, AlN, AlGaN, GaAs, SiC, and ZnO.

9. An electron source as recited in claim 6, wherein the nano-structures are formed from a conductive core and an insulating shell.

10. An electron source as recited in claim 6, wherein the conductive embedding material is selected from the group consisting of: conductive ceramics, conductive composites, metals, metal alloys, doped semiconductors, and conductive polymers.

11. An electron source as recited in claim 10, wherein the conductive composites are selected from the group consisting of carbon and silver pastes.

12. An electron source comprising:
a substrate;

a cathode disposed over the substrate, the cathode being operable to provide a source of electrons;

an emitter layer disposed over the cathode and formed from a composition of an embedding material and one or a plurality of nano-structures embedded therein, said composition including interfaces between said nano-structures and said embedding material, the emitter layer having a surface at which ends of the nano-structures are truncated, said ends of the nano-structures and said interfaces being exposed to emit electrons;

an insulator disposed over the emitter layer, the insulator having one or a plurality of apertures for exposing said ends and said interfaces; and a gate electrode disposed over the insulator and having one or a plurality of apertures that are aligned with the apertures in the insulator, the gate electrode being operable to control the emission of electrons through the apertures from the exposed nano-structures at the interfaces, a vacuum space present between the gate electrode and the surface of the emitter layer;

wherein the nano-structures are selected from the group consisting of nano-wire, nano-tube, nano-plane, nano-fiber, nano-cone, and non-diamond nano-particles; and wherein the nano-structures are conductive and the embedding material is an insulating material, said conductive nano-structures formed from an insulating core and a conductive shell.

13. An electron source as recited in claim 12, wherein the insulating core is a wide band gap semiconductor selected from the group consisting of AlN, AlGaN, BN, SiC, diamond, and GaN.

14. An electron source comprising:

a substrate;

a cathode disposed over the substrate, the cathode being operable to provide a source of electrons;

an emitter layer disposed over the cathode and formed from a composition of an embedding material and one or a plurality of nano-structures embedded therein, said composition including interfaces between said nano-structures and said embedding material, the emitter layer having a surface at which ends of the nano-structures are truncated, said ends of the nano-structures and said interfaces being exposed to emit electrons;

an insulator disposed over the emitter layer, the insulator having one or a plurality of apertures for exposing said ends and said interfaces; and a gate electrode disposed over the insulator and having one or a plurality of apertures that are aligned with the apertures in the insulator, the gate electrode being operable to control the emission of electrons through the apertures from the exposed nano-structures at the interfaces, a vacuum space present between the gate electrode and the surface of the emitter layer;

wherein the nano-structures are selected from the group consisting of nano-wire, nano-tube, nano-plane, nano-fiber, nano-cone, and non-diamond nano-particles; and wherein the nano-structures are a composite structure having alternating insulating and conductive layers.

15. An electron source as recited in claim 14, wherein the embedding material is composed of a single material.

16. An electron source as recited in claim 14, wherein the embedding material is composed of multiple different materials.

17. An electron source as recited in claim 14, wherein the nano-structure is grown in alignment and with controlled spacing between nano-structures.

18. An electron source as recited in claim 14, wherein the nano-structures are grown randomly.

19. An electron source as recited in claim 14, wherein the nano-structures are prefabricated.

20. An electron source as recited in claim 14, wherein the cathode electrode is configured as rows of substantially parallel strips, each cathode strip for providing an independent source of electrons;

wherein the gate electrode is configured as columns of substantially parallel strips, each column strip intersecting with the rows of cathode strips at intersection patches and having one or a plurality of apertures at each intersection patch, wherein each gate electrode is configured to control the emission of electrons through the apertures along the gate electrode; and wherein activation of a selected cathode strip and a selected gate electrode strip determine the intersection patches that emit electrons.

21. An electron source as recited in claim 14, wherein the surface of the emitter layer is treated to induce atomic bonding to the ends of the truncated nano-structures.

22. An electron source comprising:

a substrate:

a cathode disposed over the substrate and having sidewalls, the cathode being operable to provide a source of electrons;

an emitter layer disposed over a side wall of the cathode and formed from a composition of an embedding material and one or a plurality of nano-structures embedded therein, said composition including interfaces between said nano-structures and said embedding material, the emitter layer having a surface at which ends of the nano-structures are truncated, said ends of the nano-structures and said interfaces being exposed to emit electrons; and a gate electrode disposed over the substrate and having a side wall spaced apart from and facing the emitter layer, the gate electrode being operable to control the emission of electrons from the exposed nano-structures at the interfaces of the facing emitter layer, a vacuum space present between the gate electrode and the surface of the emitter layer;

wherein the nano-structures are selected from the group consisting of nano-wire, nano-tube, nano-plane, nano-fiber, nano-cone, and non-diamond nano-particles; and wherein the exposed ends of the nano-structures and interfaces are slightly recessed from the surface of the emitter layer.

23. An electron source as recited in claim 22, wherein the nano-structures are insulators and the embedding material is conductive.

24. An electron source as recited in claim 22, wherein the nano-structures are conductive and the embedding material is an insulator.

25. An electron field emission composite comprising:

one or more nano-structures;

an embedding material in which the nano-structures are embedded, the embedding material having a surface at which ends of the embedded nano-structures are truncated, and including interfaces with the nano-structures, the ends of the nano-structures and the interface between the nano-structures and the embedding materials being exposed, said exposed ends of the nano-structures operable to emit electrons at the interfaces when under the influence of an electric field applied in a vacuum proximate to the exposed ends;

wherein the nano-structures are selected from the group consisting of nano-wire, nano-tube, nano-plane, nano-fiber, nano-cone, and non-diamond nano-particles; and wherein the exposed ends of the nano-structures and the interfaces between the ends of the nano-structures and the embedding material are slightly recessed from the surface of the embedding material.

26. An electron field emission composite as recited in claim 25, wherein the nano-structures are insulators; and wherein the embedding material is a conducting material.

27. An electron field emission composite as recited in claim 26, wherein the insulator nano-structures are made of wide band gap semiconductors such as AlN, AlGaN, BN, SiC, and GaN.

28. An electron field emission composite as recited in claim 25, wherein the nano-structure is formed from non-diamond carbon.

29. An electron field emission composite as recited in claim 28, wherein the carbon includes carbon nanotube, carbon nanofiber, carbon nanocone, carbon nanoplane and carbon nanoparticle.

30. An electron field emission composite as recited in claim 25, wherein the nano-structures are conductive; and wherein the embedding material is an insulator.

31. An electron field emission composite comprising:

one or more nano-structures;

an embedding material in which the nano-structures are embedded, the embedding material having a surface at which ends of the embedded nano-structures are truncated, and including interfaces with the nab-structures, the ends of the nano-structures and the interface between the nano-structures and the embedding materials being exposed, said exposed ends of the nano-structures operable to emit electrons at the interfaces when under the influence of an electric field applied in a vacuum proximate to the exposed ends;

wherein the nano-structures are selected from the group consisting of nano-wire, nano-tube, nano-plane, nano-fiber, nano-cone, and non-diamond nano-particles; and wherein the nano-structures are a composite structure having alternating insulating and conductive layers.

32. An electron field emission composite as recited in claim 31, wherein the nano-structures are grown on a substrate.

33. An electron field emission composite recited in claim 32, wherein the nano-structures are grown in alignment and with controlled spacing between the nano-structures.

34. An electron field emission composite as recited in claim 31, wherein the nano-structures are pre-fabricated; and wherein the embedding material is formed from a slurry.

35. An electron field emission composite as recited in claim 34, wherein the slurry is formed from a conducting composite selected from the group consisting of carbon and silver pastes.

36. An electron field emission composite as recited in claim 31, wherein the embedding material is composed of multiple different materials.

* * * * *